United States Patent Office 2,833,687
Patented May 6, 1958

2,833,687

METHOD FOR CONTROLLING NEMATODE INFESTATIONS AND NEMATOCIDES USEFUL THEREFOR

W E Craig, Philadelphia, and John O. Van Hook, Roslyn, Pa., assignors to Rohm & Haas Company, Philadelphia, Pa., a corporation of Delaware No Drawing. Application February 7, 1956
Serial No. 563,834

5 Claims. (Cl. 167—22)

The present invention relates to an improved nematocide and to methods of employing it for the purpose of controlling infestations of nematodes or nemas in soil, especially that in which or adjacent to which cultivated crops or plants are growing or are to be planted.

At the present time, the most common materials used for this purpose are volatile or gaseous halogenated aliphatics or aromatics, such as dichloropropylenes. These materials have the disadvantage of damaging the rootlets of many types of live plants. In addition, because of their insolubility in water, they can only be applied satisfactorily by drilling into the soil.

In accordance with the present invention, it has been found that 2,2,2-trichloro-1-cyanoethyl acetate is an effective nematocide when introduced into soil infested with many types of nemas, eggs, and cysts, including the root knot nematodes of the genus *Meloidogyne*, the meadow or root lesion nematodes of the genus *Pratylenchus*, the stubby root nematodes of the genus *Trichodorus*, the sting nematodes (*Belonolaimus gracilis*), the bulb and stem nematodes of the genus *Ditylenchus*, the golden nematodes, the sugarbeet nematodes and the awl nematode. These nemas and others infest soils used in growing such crops as citrus fruits, tomatoes, potatoes, persimmons, pineapples, carrots, celery, beets, sugarbeets, corn, wheat, rye, oats, as well as many other economically important crops. The soil in which these crops may be grown may have a wide range of pH from a value of 3 to as high as a value of about 8, though for many crops the soil is preferably in a narrow pH range of about 4.5 to 6. The 2,2,2-trichloro-1-cyanoethyl acetate is effective throughout this wide range of pH. The 2,2,2-trichloro-1-cyanoethyl acetate also has fungicidal activity and it has been found to be generally non-phytotoxic on the roots of living plants when employed at a concentration on the soil where it is effective against the nematodes.

The 2,2,2-trichloro-1-cyanoethyl acetate may be applied to the soil either in bulk or emulsified in water. This may be effected by using suitable emulsifying agents; if desired, the acetate may first be dissolved in a solvent therefor, such as acetone, dioxane, or the like and the solution may then be emulsified in water with suitable agitation and emulsifying agents. When applied in an aqueous emulsion, the 2,2,2-trichloro-1-cyanoethyl acetate may have a concentration of from 1% to 50% or more, and the aqueous emulsion may be employed as an irrigant for the crops when they are already growing in the soil. When used in the irrigant, it may be flowed over the area infested with the nematodes. The 2,2,2-trichloro-1-cyanoethyl acetate may be introduced either in bulk or as an aqueous emulsion by injection through nozzles which are inserted into the soil to the desired depth from 1 inch to 12 inches, and the injection may be accompanied with a plowing operation wherein the nozzle or nozzles introduce the 2,2,2-trichloro-1-cyanoethyl acetate or an emulsion thereof into the furrow made by the plow so that subsequent turning of the soil in making the next furrow covers the previous deposit of the acetate. If desired, the soil area treated may subsequently be covered with a canvas or other cloth, but this is generally unnecessary.

The 2,2,2-trichloro-1-cyanoethyl acetate may be employed in a wide range of concentrations on the weight of soil. Generally, a proportion of 5 to 100 parts per million on the weight of soil is adequate and it has been found that 20 to 50 parts per million serves to control most types of nematodes. Accordingly, the preferred rate of application is from 20 to 50 parts per million on the weight of soil. This in practice generally amounts to from 20 pounds to 800 pounds per acre depending upon the depth of soil to which treatment is carried, which may be up to 6 to 12 inches depending on the particular type of nemas involved. Preferably from 100 to 300 pounds per acre are applied.

The following examples, in which the parts are by weight unless otherwise indicated, are illustrative of the invention:

Example 1

Pint jars are filled with soil heavily infested with root knot nemas and other pint jars are filled with soil heavily infested with sugarbeet nemas. 2,2,2-trichloro-1-cyanoethyl acetate is applied into the center of the soil mass in each jar at a dosage of 0.05 ml. per pint. The jars are closed and stored for one week at 70° F. after which the soil is emptied into clay pots wherein they are left another week, tomato seedlings are transplanted thereinto and allowed to grow for 3 to 7 weeks. At the end of this period, the root system of the plant is washed clean and the number of galls per root system are counted in the jars or pots originally containing the root knot nematodes. Whereas three plants grown in a control sample of the soil have an average of 151 galls per plant, the plants in the treated soil show no galls whatsoever.

In the jars or pots originally containing the sugarbeet nematodes, the number of live females in a 50 ml. volume of soil is counted, being 152 (average of 3 jars) in a control soil and being reduced to 6 (average of 3 jars) in the case of the treated soil.

Example 2

When 2,2,2-trichloro-1-cyanoethyl acetate is dissolved at various concentrations in conventional hydrocarbon solvents used in insecticidal and fungicidal applications, such as methyl naphthalenes, known to the trade as HAN solvent, it shows an $LD_{50}$ at a concentration of less than 5 parts per million against both *Stemphylium sarcinaeforme* and *Monilinia fructicola*. It is non-phytotoxic to tomatoes even at a use concentration of 0.5%.

Example 3

A soil containing 1127 nema larvae of the citrus nematode *Tylenchulus semipenetrans*, per 50 ml. thereof, is introduced into a receptacle and 2,2,2-trichloro-1-cyanoethyl acetate is introduced in an amount of 40 parts per million on the weight of the soil and thoroughly mixed in by shaking. Three days later, examination of the soil reveals that the 2,2,2-trichloro-1-cyanoethyl acetate has effected a 100% kill of the nemas.

Example 4

Glazed pots of two-gallon capacity are each filled with 27 pounds of soil infested with the citrus nematode and 0.5 ml., 1 ml., and 2 ml. of 2,2,2-trichloro-1-cyanoethyl acetate are introduced into a central part of the soil mass in each of several such pots. All nema larvae are killed even at the 0.5 ml. dosage as determined by examination after 48 hours. Three-month old sour orange seedlings are transplanted to the pots one week after treatment with the 2,2,2-trichloro-1-cyanoethyl acetate. No injurious effect to the seedlings is found in pots containing the 0.5 ml. dosage. At the 1 ml. dosage, three plants are unaffected and one shows wilting. When transplanted three weeks after injecting the cyanoethyl acetate, all seedlings are unaffected at all dosages including the 2 ml. dosage.

*Example 5*

Three-month old sour orange seedlings are potted in one-gallon containers filled with soil heavily infested with citrus nematodes. 500 ml. of an aqueous emulsion of 2,2,2-trichloro-1-cyanoethyl acetate is applied to the soils, the emulsion providing a concentration of 20 parts per million of 2,2,2-trichloro-1-cyanoethyl acetate based on the weight of the soil in one instance, 40 parts per million, and 80 parts in another. As determined by examination 25 days after treatment, there is no injury to seedlings in the pots treated with 20 and 40 parts per million respectively, but some wilting occurred in the pot treated with 80 parts per million.

It is to be understood that changes and variations may be made without departing from the spirit and scope of the invention as defined in the appended claims.

We claim:

1. A method of controlling nematode infestations of soil which comprises introducing 2,2,2-trichloro-1-cyanoethyl acetate into the soil infested with nematodes.

2. A method of controlling nematode infestations of soil which comprises introducing 2,2,2-trichloro-1-cyanoethyl acetate into the nematode-infested soil in an amount from 5 to 100 parts per million of the acetate based on the weight of the soil.

3. A method of controlling nematode infestations of soil which comprises applying to the nematode-infested soil an aqueous irrigant containing 2,2,2-trichloro-1-cyanoethyl acetate emulsified therein by an emulsifying agent.

4. A method of controlling nematode infestations of soil which comprises applying to the soil infested with the nematodes from 20 to 800 pounds of 2,2,2-trichloro-1-cyanoethyl acetate per acre of the soil.

5. A method of controlling nematode infestations of soil which comprises applying to the soil infested with the nematodes from 100 to 300 pounds of 2,2,2-trichloro-1-cyanoethyl acetate per acre of the soil.

References Cited in the file of this patent

UNITED STATES PATENTS 2,344,105    Peters ----------------- Mar. 14, 1944